United States Patent [19]

Jung

[11] Patent Number: 5,333,259
[45] Date of Patent: Jul. 26, 1994

[54] GRAPHIC INFORMATION PROCESSING SYSTEM HAVING A RISC CPU FOR DISPLAYING INFORMATION IN A WINDOW

[75] Inventor: Jae-heon Jung, Seoul, Rep. of Korea

[73] Assignee: Samsung Electronics Co., Ltd., Kyunggi, Rep. of Korea

[21] Appl. No.: 902,885

[22] Filed: Jun. 23, 1992

[30] Foreign Application Priority Data

Nov. 22, 1991 [KR] Rep. of Korea .................. 91-20892

[51] Int. Cl.⁵ .............................................. G06F 15/20
[52] U.S. Cl. .................................. 395/162; 395/164; 345/201; 345/196
[58] Field of Search ............... 395/162, 164–166, 395/375, 250, 275; 364/DIG. 1, DIG. 2; 340/798–800, 750; 345/185, 196, 201, 119, 120

[56] References Cited

U.S. PATENT DOCUMENTS 4,992,934  2/1991  Portanova et al. ................. 395/375
5,163,131  11/1992  Row et al. ..................... 364/DIG. 1

Primary Examiner—Dale M. Shaw
Assistant Examiner—Kee M. Tung
Attorney, Agent, or Firm—Leydig, Voit & Mayer

[57] ABSTRACT

A computer related system including a reduced instruction set computer (RISC) central processing unit for effectively processing a data bottleneck phenomenon due to a great deal of data on a bus occurring from the use of graphic processing and windows. The system comprises a RISC central processing unit having address, instruction and data buses, a memory device for storing and reading instructions and/or data, which is connected to RISC central processing unit via the buses, an image processor for processing information as a video signal so as to be displayed on a video display apparatus, which is connected to the address and data bus, and a network interface connected with the data bus and enabling information exchange between the system and an external host computer.

12 Claims, 2 Drawing Sheets

GRAPHIC INFORMATION PROCESSING SYSTEM HAVING A RISC CPU FOR DISPLAYING INFORMATION IN A WINDOW

BACKGROUND OF THE INVENTION

The present invention relates to a graphic information processing system having a reduced instruction set computer (hereinafter referred to as "RISC") central processing unit (CPU) in a digital information processing system, and more particularly, one capable of effectively processing a great deal of data generated in the use of windows and graphical processing.

Computers, word-processors, and CAD/CAM systems are generally referred to as digital information processing systems, which process information digitally. Each such system displays graphical information processed in an external host computer in a plurality of windows on display via inter-communication with the external host computer, and transmits the information produced by an input device to the host computer.

Here, the windows previously mentioned refer to a rectangular region into which the graphic information processed in the computer is mapped according to window viewport transformation. Generally, window viewport transformation also refers to a transformation map of a figure within a rectangle region parallel to the coordinate axis in a coordinate system, into the rectangle region parallel to the coordinate axis in the same or other coordinate system, while preserving the relative scale of the coordinates.

To display a plurality of windows on the type of display previously described and process a great deal of data produced in a window graphic environment, there is needed a system capable of processing graphic information from a host computer or a great deal of information generated by an input event.

The accompanying drawing FIG. 1 is a schematic block diagram illustrating a graphic information processing system according to prior art. Each major element shown in FIG. 1 is connected to buses for data transmission among them. The buses serve as a path by which data and instructions that are processed and executed at respective devices, are transmitted.

In this configuration, all instructions and data input from the input devices are transmitted to a host computer or memory devices through a bus, and information processed in the host computer is also transmitted to a corresponding graphic information processing system of each terminal. In the above-mentioned graphic information processing system, a complex instruction set computer (hereinafter referred to as a "CISC") CPU 20 takes charge of the whole operation of the system. A read only memory (ROM) 30 stores a program for booting the system, a random access memory (RAM) 10 stores the instructions and data of programs for carrying out the function of the system, and a non-volatile RAM (hereinafter referred to as an "NVRAM") 40 preserves system settings, i.e., initial settings for each component and primary characteristic data thereof, even when there is no power supplied.

The system is connected with the host computer via a network 82, and drives a network controller 81 so as to inter-communicate either data required by the system or that generated by the host computer. The system employs a buffer memory 80 in order to execute an effective data processing and shorten the waiting time of the CPU. Graphic data generated by the host computer is transmitted to a video memory 60 after processing in CISC CPU 20, while a video controller 61 displays information from video memory 60 on a monitor 62. As the case is, a processor for graphic exclusive processing use is employed to effectively process graphic data. Information is input to the system via a mouse 71 or a keyboard 91, and auxiliary port 72 is provided for connection with miscellaneous input/output devices or communication with the host computer besides network 82, which is driven by serial input/output unit 70 and keyboard controller 90. In addition, a speaker 50 is provided for audio output.

In the prior art as previously explained, graphic data transmitted via the network by a host computer is fed to video memory 60 via the bus after processing in CISC CPU 20. Data generated by an input/output device is transmitted to respective devices via the bus after processing in CISC CPU 20. Data processed in a system itself is also transmitted via the bus to the respective devices after processing in CISC CPU 20. Namely, since this data is being transmitted via one bus and overall operation of the terminal is controlled by CISC CPU 20, when the graphic information processed in a host computer is displayed on a plurality of windows on display, the quantity of information to be processed at the terminal and that to be communicated with the host computer becomes much larger than that of the system, which mainly processes characters. This results in a bottleneck in the flow of data because a plurality of clock cycles are needed to execute one instruction, and is due to the characteristics of the CISC CPU.

Further, such a problem can not be solved effectively even if a processor for graphic exclusive processing is additionally employed to effectively process the graphic information, which would result in advanced cost. Moreover, once graphic processing is executed simultaneously using a plurality of windows requiring high resolution of displays, then the terminal's performance gets worse.

SUMMARY OF THE INVENTION

Accordingly, it is an object of the present invention to provide a graphic information processing system for removing a data bottleneck phenomenon occurring when processing graphic information.

It is another object of the present invention to provide a graphic information processing system enabling an instruction being processed in a clock cycle, a meritorious characteristic of a RISC CPU, by providing more data transmission paths, thereby speeding up processing time. To achieve the above object, a graphic information processing system according to the present invention, comprises:

- a RISC CPU having an address bus, an instruction bus and a data bus;
- a memory device connected with the address bus, instruction bus and data bus for storing instructions and data applied thereto;
- an image processor for processing information into video signal form so as to be displayed on an image display apparatus, connected with the address bus and data bus; and
- a network interface for communication between an external host computer and the system, connected with the data bus.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1:
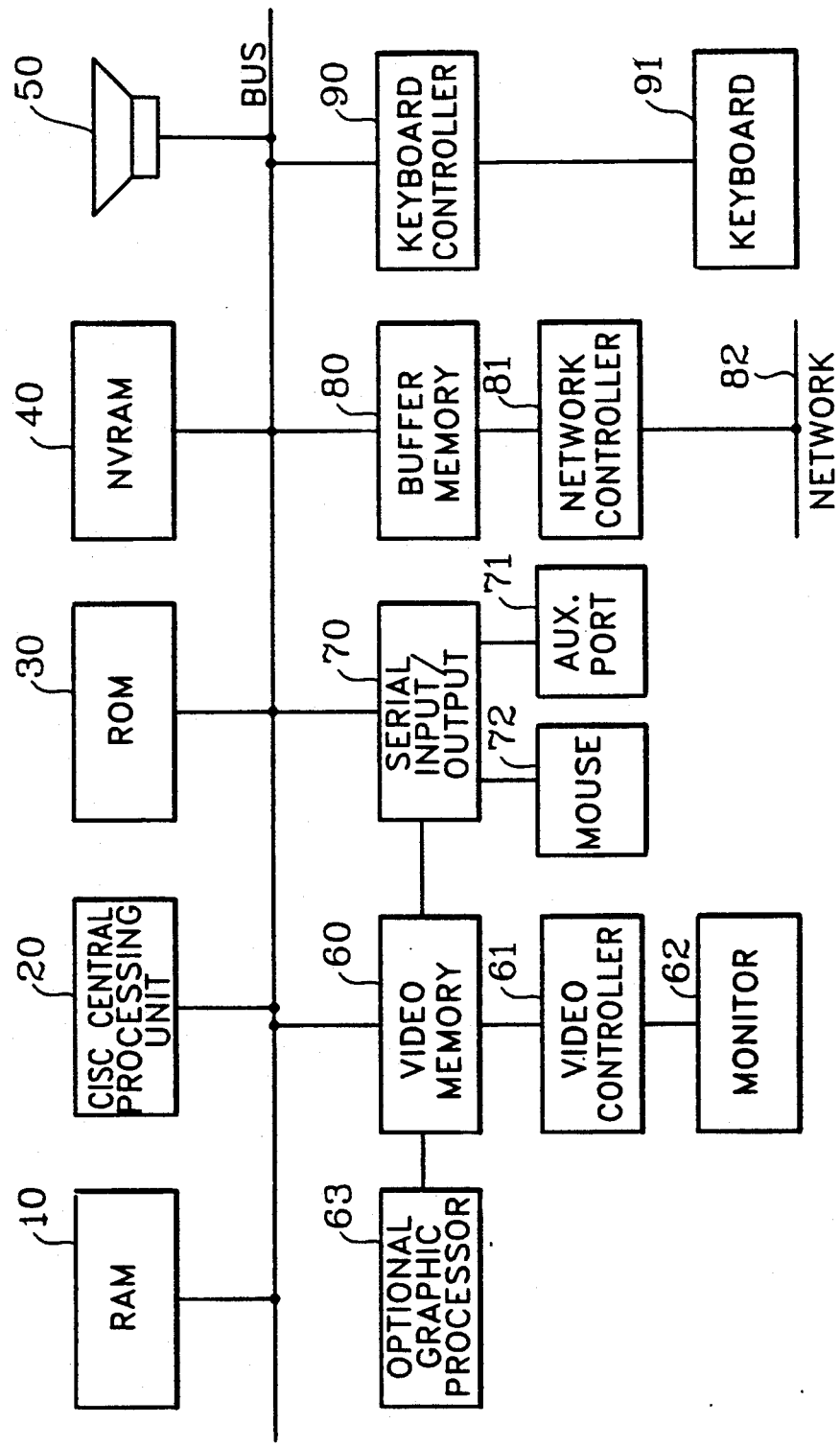
FIG. 1 is a schematic block diagram illustrating a graphic information processing system according to the prior art.
Figure 2:
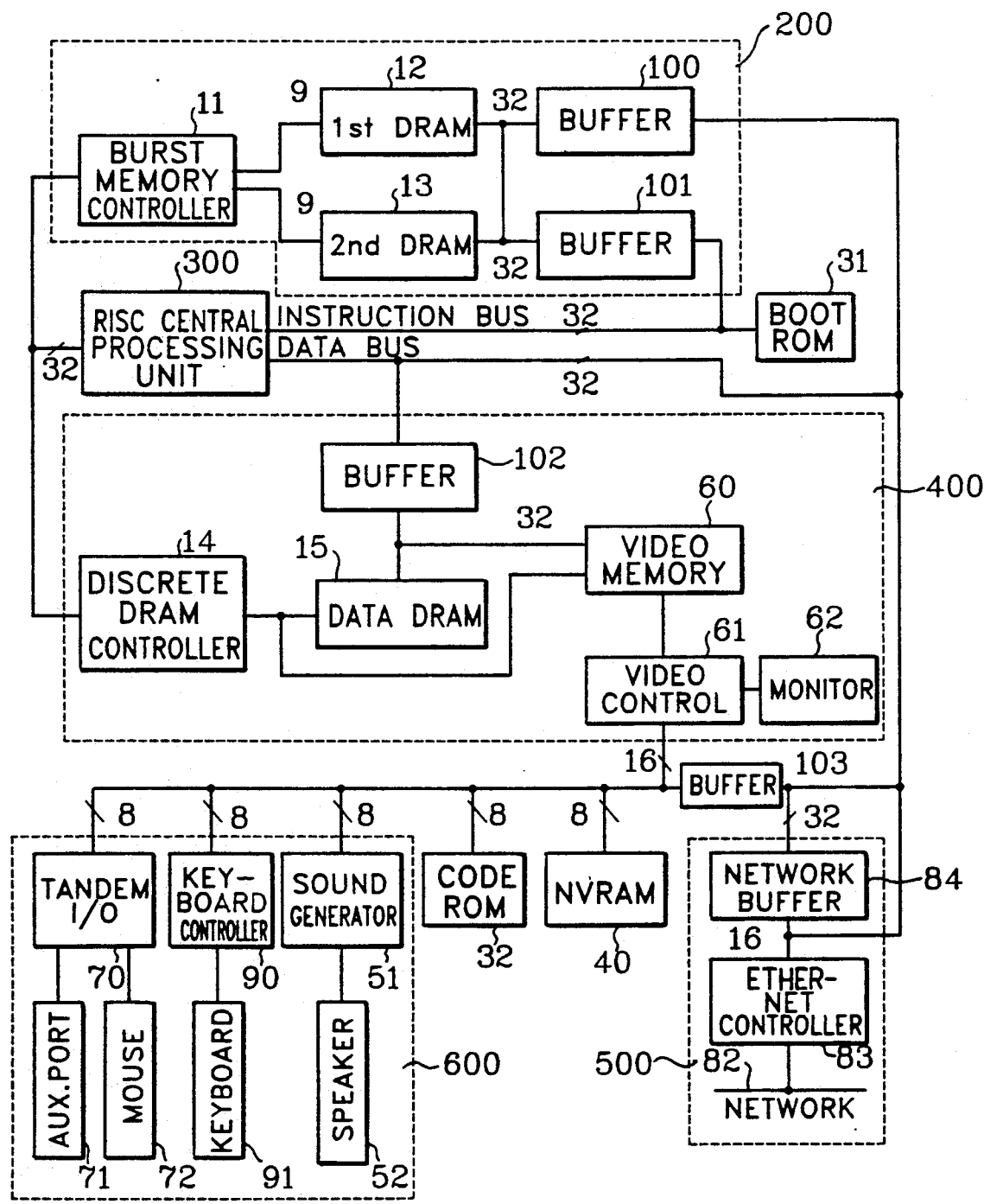
FIG. 2 is a schematic block diagram illustrating graphic information processing system according to the present invention.

FIG. 2 is schematic block circuit diagram illustrating a graphic information processing system according to the present invention. Explanation will now be given to the detailed interconnection thereof, in which both the first and second address output signals of a burst memory controller 11 are connected to the respective address inputs of a first and a second dynamic random access memory (DRAM) 12 and 13. The data signals of first and second DRAMs 12 and 13 are connected to the respective data terminals of buffers 100 and 101; buffer 100 being on the data bus and buffer 101 on the instruction bus.

A RISC CPU 300 is provided with an address bus, a data bus and an instruction bus. The address bus is connected with the address input of burst memory controller 11 and that of a discrete DRAM controller 14. The instruction bus is connected to a boot ROM 31 and buffer 101. The data bus is connected at the respective data terminals of buffers 100, 102 and 103, a network buffer 84 and an ethernet controller 83. The address output of discrete DRAM controller 14 is connected to the address input of a data DRAM 15 and a video memory 60. The video memory 60 is connected with a video controller 61 which is connected to a monitor 62 and the data bus. Network buffer 84 is connected to ethernet controller 83, which in turn is connected to a network 82. Buffer 103 is connected to a serial input/output device 70, a code ROM 32, an NVRAM 40, a keyboard controller 90 and a sound generator 51. A mouse 72 and an auxiliary port 71 are connected to serial input/output device 70, while key board controller 90 is connected with key board 91 and a sound generator 51 is connected with a speaker 52.

Now, explanation is given to the operation of the system as shown in FIG. 2. The burst memory controller 11 is in charge of overall control functions of a main memory device 200 is provided with two output terminals for an address signal consisting of 10 bits that are supplied to first and second DRAMs 12 and 13, respectively, generating a control signal for either storing instructions or data, reading and transmitting instructions or data, or reading and transmitting instructions or data in and out of each memory device. For an illustrative purpose as shown in FIG. 2, one burst memory controller serves as a DRAM controller for which instructions and data are combined with each other. However, two controllers may be employed so as to respectively control the data and instructions.

In such a case, the drawback of using only one controller, i.e., one in which the data and instructions are never fetched simultaneously is that one process must be executed after completion of a prior process can be solved. However, considering cost and space efficiency, one controller may be employed in this embodiment of the present invention for which a detailed explanation is given hereinbelow. In addition, the present invention employs DRAMs 12 and 13, both of which are interleaved types. Namely, the DRAMs are of such type that all the instructions having odd-numbered addresses are recorded in one memory bank, while even-numbered addresses are in another memory bank, thereby resulting in reducing memory access time by half. Once an address signal of 32 bits applied via the address bus from RISC CPU 300 is decoded, then the decoded relevant address of 9 bits is supplied to first or second DRAM 12 or 13. Thereafter, the data signals at first or second DRAM 12 and 13 are transmitted via the bidirectional buffer 100, while instruction signals are transmitted via the unidirectional buffer 101. Here, the data transmitted between buffers (100,101) and memory devices (12,13) consists of 32 bits. Also, one burst memory controller with the discrete DRAM controller 14 allows the RISC chip to access the data and instruction while doing the burst instruction access.

The image processing part 400 processess information in the form of a video signal so as to display information on an image display monitor. The image processing part 400 comprises discrete DRAM controller 14, unidirectional buffer 102, data DRAM 15, video memory 60 and video controller 61. A monitor 62 may be connected for displaying information. When a 32-bit address signal is fed to discrete DRAM controller 14 from RISC CPU 300 via the address bus, the discrete DRAM controller decodes the applied signal, supplying the corresponding address to data DRAM 15 and video memory 60, and then controls the two memory devices. Namely, it controls data supplied via data bus to buffer 102 to be stored into corresponding memory device or to read out the thus-stored data to be transmitted for displaying on the image display device. At this time, the data being transmitted via the buffer consists of 32 bits. The video controller 61 controls the functions for displaying video data on monitor 62, and shifting read out data to monitor 62 as well as clocking the read out data from RAM. The network 500 for enabling information exchange between the system and external host computers, is connected with the data bus, and comprises a network buffer 84, ethernet controller 83, and network 82. Here, network buffer 84 is a memory device for temporarily storing data input from the host computer via network 82 and data used for transmitting data processed in the CPU.

On this occasion, the above-mentioned data transmitted via the data bus to network 500 consists of 32 bits. The aforementioned term Ethernet refers to a coaxial cable network which promptly stops the transmission when a collision is detected while another station is transmitting. A boot program for the system is stored in boot ROM 31, a program for a system operation after the initial boot is stored in code ROM 32, and information for the terminal setting is stored in NVRAM 40. When the information for setting is changed, the stored information can be updated.

The graphic information processing system as described above, using a RISC CPU having three buses, effectively processes a great deal of data produced in a plurality of windows and those produced in graphic information processing and thereby communicates via the network with the host computer more efficiently, thus suppressing the conventionally-occurring data bottleneck phenomenon.

While there has been a drawback for the conventional system using one bus, wherein during communication with a host computer, tasks to be done must be done on a stand-by status, resulting in slow speed, the present invention, however, which is capable of parallel manipulation by using three buses, has the advantage of fast processing.

What is claimed is:

1. A graphic information processing system for displaying graphic information on a plurality of windows on a screen, said graphic information processing system comprising:
    a reduced instruction set computer (RISC) central processing unit having an address bus, an instruction bus, and a data bus;
    a memory device for storing or reading out instructions or data, which is connected with said RISC central processing unit via said instruction and data buses, said memory device including:
        a main memory device for storing information that is applied thereto,
        a memory controller for receiving via said address bus an address signal being applied thereto from said RISC central processing unit and then controlling said main memory device,
        a first buffer for temporarily storing and transmitting applied information, which is connected between said main memory device and said data bus, and
        a second buffer for temporarily storing and transmitting applied information, which is connected between said main memory device and said instruction bus;
    an image processor connected with either said address or data bus, for processing information being processed as a video signal so that the processed video signal is displayed on a video display apparatus; and
    a network interface connected with said data bus and for enabling information exchange between said graphic information processing external host computers.

2. A graphic information processing system according to claim 1, further comprising an external input/output device for the input or output of information, which is connected with said data bus.

3. A graphic information processing system according to claim 1, in which said main memory device is divided into first and second interleaved memory portions.

4. A graphic information processing system according to claim 3, in which said first buffer is a bidirectional buffer.

5. A graphic information processing system according to claim 4, in which said image processor having a monitor comprises:
    a video memory for storing graphic information applied via said network interface, which is connected with said data bus;
    a third buffer for temporarily storing and transmitting applied information, which is connected between said data bus and said video memory;
    a second memory controller for receiving via said address bus an address signal being applied from said RISC central processing unit and controlling said video memory; and
    a video controller having a control function for displaying the information of said video memory on said monitor.

6. A graphic information processing system according to claim 5, further comprising an extended type memory for storing applied information, which is connected between said third buffer and said second memory controller.

7. A graphic information processing system according to claim 6, wherein a parallel manipulation of data transmission for information applied from said network interface to said image processor via said data bus is carried out when an instruction is executed from said main memory device via said instruction bus to said RISC central processing unit using said three busses.

8. A graphic information processing system for displaying graphic information on a plurality of windows on a screen, said system comprising:
    a reduced instruction set computer (RISC) central processing unit connected to an address bus, an instruction bus, and a data bus;
    a memory device for storing or reading out instructions or data, said memory device being connected with said RISC central processing unit via the instruction and data buses, said memory device including a main memory device for storing information that is applied thereto, a memory controller which receives an address signal from said RISC central processing unit via the address bus and controls said main memory device, a first buffer connected to said main memory device and the data bus which stores applied information and which transmits applied information via the data bus, and a second buffer connected to said main memory and the instruction bus which temporarily stores applied information and which transmits applied information via the instruction bus;
    image processor means connected with said RISC central processing unit via the address bus and the data bus, for processing information selected from the data bus as a video signal and for displaying the processed video signal; and
    means for enabling information exchange between said graphic information processing system and external host computers.

9. A graphic information processing system according to claim 8, in which said main memory device is divided into at least two memory portions having interleaved control.

10. A graphic information processing system according to claim 9, in which said first buffer is a bidirectional buffer.

11. A graphic information processing system according to claim 10, in which said image processor means comprises:
    a display monitor;
    a video memory connected with said data bus for storing graphic information applied via said means for enabling information exchange;
    a third buffer connected to said video memory for temporarily storing and transmitting applied information;
    a second memory controller connected to said RISC central processing unit via the address bus which decodes address signals transmitted by said RISC central processing unit; and
    a video controller connected to said video memory and said display monitor, said video controller having a control function for displaying the information of said video memory on said display monitor.

12. A graphic information processing system according to claim 11, further comprising an extended type memory for storing applied information, which is connected between said third buffer and said second memory controller.

* * * * *